United States Patent [19]

Depcik et al.

[11] Patent Number: 4,780,255
[45] Date of Patent: Oct. 25, 1988

[54] SYNTHETIC RESIN PARTS WITH QUASI DIELECTRIC ISOTROPIC STRUCTURE

[75] Inventors: Hans-Werner Depcik, Duesseldorf; Hans G. Fitzky, Odenthal; Helmut Schmid, Krefeld; Ulrich Schütz, Leichlingen, all of Fed. Rep. of Germany

[73] Assignee: Bayer Aktiengesellschaft, Fed. Rep. of Germany

[21] Appl. No.: 853,413

[22] Filed: Apr. 17, 1986

[30] Foreign Application Priority Data

Apr. 26, 1985 [DE] Fed. Rep. of Germany ....... 3515109

[51] Int. Cl.$^4$ ............................................. B29C 71/04
[52] U.S. Cl. ......................................... 264/23; 264/26; 264/71; 264/237; 264/327; 264/348; 264/DIG. 46; 425/174.7; 425/174.8 R
[58] Field of Search ............ 264/24, 23, 70, 71, 264/72, 237, 348, DIG. 46, 1.4, 26, 25, 327; 425/174.8 R, 174.2, 174.8 E, 174.4

[56] References Cited

U.S. PATENT DOCUMENTS

| | | | |
|---|---|---|---|
| 3,184,791 | 5/1965 | Gamble et al. | 425/174.2 |
| 3,246,055 | 4/1966 | Pendleton | 425/174.2 |
| 3,306,835 | 2/1967 | Magnus | 425/174.2 |
| 3,447,480 | 6/1969 | Bodine, Jr. | 264/23 |
| 3,447,587 | 6/1969 | Bodine, Jr. | 264/23 |
| 3,568,273 | 3/1971 | Ogden et al. | 425/174.2 |
| 3,717,427 | 2/1973 | Bodine | 264/23 |
| 4,147,488 | 4/1979 | Chiron | 425/174.8 E |
| 4,469,649 | 9/1984 | Ibar | 425/174.2 |

Primary Examiner—Jeffery Thurlow
Attorney, Agent, or Firm—Connolly and Hutz

[57] ABSTRACT

A mass is cooled systematically under the influence of an electrical or mechanical alternating field to obtain a quasi dielectric isotropic structure of a synthetic resin part.

10 Claims, 1 Drawing Sheet

SYNTHETIC RESIN PARTS WITH QUASI DIELECTRIC ISOTROPIC STRUCTURE

This invention relates to a process and to a synthetic resin part with quasi dielectric isotropic structure, in particular with low double refraction, produced by this process in which a mass of synthetic resin part which is still at least partly deformable is converted.

In magneto-optical storage processes, the carrier materials should be as free from double refraction as possible, especially if the signal distances are narrow, in order to ensure a good signal to noise ratio when the magnetically stored information is read out.

Synthetic resin parts produced by the injection moulding process are liable to have a high double refraction perpendicularly to the direction of flow owing to the powerful orientation to which the macromolecules are subjected as a result of the shear velocities when the mould is being filled. The degree of double refraction, for example in the case of amorphous thermoplasts, depends not only on the nature of the polymers but also on the temperature- and flow-field until the glass temperature is reached. Particularly high double refraction values prevail in the layers near the surface and may be expected to increase in the direction of feed. A rise in the mass temperature and moulding temperature and reduction in the after-pressure generally provides improvements mainly in the interior of the synthetic resin part but they are normally not sufficient to satisfy requirements of freedom from double refraction.

It is an object of the present invention to provide an economical process which avoids the disadvantages mentioned above. In particular, the process should enable conventional synthetic resin parts produced, for example. by casting or injection moulding to be sufficiently influenced in their structure so that they will have a quasi optical, mechanical-technological and dielectric isotropy. Furthermore, the finished synthetic resin products should have a low tension and freedom from double refraction with a low mean value and minimum peak deviations.

To solve this problem according to the invention,
(a) the synthetic resin part is subjected to an alternating field with a frequency of $10^3$–$10^{10}$ Hz,
(b) the at least partly mobile dipoles of the dielectric synthetic resin parts are subjected to a process of relaxation while energy is supplied, and
(c) the alternating field is reduced continuously and/or stepwise until the dipole freezes.

The orientation of the dipoles of the polymers which is due to the manufacturing process and is preferentially in the direction of the thickness and which may lead to double refraction or a mechanically anisotropic structure is controlled during solidification of the polymer by means of an alternating field which is continuously reversed in polarity (plus-minus), and the orientation is thereby removed or at least reduced. At the same time, the quasi isotropic distribution of the dipoles is frozen, for example by the stepwise withdrawal of energy. Under technical conditions. for example, this state is reached by lowering the temperature to about 10 deg. Cent. below the melting and glass temperature. Since the alternating field may set in immediately after introduction of the mass into the mould, where the dipoles of the polymers are, of course, mobile, the additional consumption of energy is slight compared with the energy required for heating up to the temperature.

At the same time, the process remains economical since the time up to solidification is increased only to a limited extent. Lastly, it is highly surprising that as a result of this process, the double refraction, which occurs mainly in the surface region, can be reduced to $\frac{1}{2}$ $\frac{1}{3}$ or less the 1/5, depending on the duretion of action, of the double refraction value normally obtained under the same conditions of time and temperature of the plastic mass at the end of a conventional process. The low double refraction results in an excellent signal to noise ratio. At the same time, the intrinsic tensions in the synthetic resin part are frozen at a very low level.

In one advantageous embodiment of the process, a temperature gradient which counteracts the usual outwardly directed temperature gradient is obtained by a supply of energy.

During the process of solidification, the supply of energy reheats the mass in the boundary regions, i.e. in the opposite direction to the normal direction of cooling, so that the orientation of the dipoles which is originally determined by the mould and flow of material and frozen by the more rapid cooling is converted by the action of the alternating field into a quasi dielectric isotropic arrangement and then frozen.

In one economical embodiment of the process, the alternating field employed is a three-dimensionally upright electric alternating field having a frequency of $10^3$–$10^8$ Hz, preferably $10^3$–$10^5$ Hz, with a field strength of 1–100 kV/cm, in particular 20–80 kV/cm.

The electromagnetic alternating field is distinguished by the fact that it can be accurately controlled according to the required conditions, the frequency to which it is required to be adjusted decreasing with increasing length of the molecular chains while the field strength should preferably lie 10–30% below the dielectric strength for the sake of optimum utilization. The energy required depends on the frequency and the dielectric loss factor tan δ.

In one advantageous method of carrying out the process, the alternating field is produced from longitudinal and/or transverse oscillations by ultrasound at a frequency of $10^3$–$10^6$ Hz, preferably $10^3$–$10^4$ Hz, with an energy density of 1–100 W/cm.

The dipoles can, of course, also be moved mechanically, in which case the oscillations should lie within the range of the natural resonance.

In one tested method of carrying out the process, the alternating oscillations are beamed in simultaneously in at least two directions perpendicular to one another.

Good isotropy is obtained by exposing the dipoles to the action of a rotary field which may have different radii in different directions. At the same time, any additives subject to dielectric loss can be suitably distributed.

In another embodiment of the process, the amplitude of the alternating oscillation is reduced from its initial value towards zero.

Reduction of the amplitude enables the energy supply to be reduced to such an extent that a statistically uniform distribution of all the dipole directions occurs, and the initial amplitude should only be great enough to provide the necessary energy for moving the dipoles in the synthetic resin part.

In another embodiment of the process, the frequency of the alternating oscillation is reduced or increased during the treatment.

The greatest energy supply takes place in the region of the relaxation times of the dipoles. In this region, relatively small changes in frequency are often sufficient to alter the energy supply. Frequency changes are advantageous if the statistically distributed dipole orientations are to be rapidly frozen or if the dipoles of the surface regions which are the first to cool are required to be briefly reheated in order to eliminate any orientation produced by cooling.

In one possible embodiment of the process, the solidifying mass is subjected to the alternating field before it reaches a viscosity of 10,000 Pas, in particular 6000 Pas.

By subjecting the mass to the field energy while it is still at a relatively low viscosity inside the mould, statistical distribution of the dipole orientations, which is necessary for duraplasts tending to double refraction and is economically advantageous for thermoplasts, can be achieved with relatively little expenditure of energy.

In a preferred embodiment of the process, the alternating field used for a mass of amorphous thermoplasts in a mould is switched on at a temperature greater than or equal to the glass temperature ($T_g$) plus 80 deg. cent.

It is only when this temperature is reached that sufficiently good statistical distribution of the dipoles can be achieved in amorphous thermoplasts. With such a starting temperature it is possible to produce a synthetic resin part which is substantially free from double refraction.

In one advantageous embodiment of the process, the alternating field used for partially crystalline thermoplasts in the form of a mass inside a mould is switched on at a temperature greater than or equal to the melting temperature ($T_s$) plus 10 deg. cent.

When such a starting temperature is employed, the orientation present in the crystalline region of the thermoplasts as a result of shearing forces during filling of the mould can be eliminated by the alternating oscillations.

In one conceivable method of carrying out the process, the initial temperature employed for a mass of copolymer heteropolymers or polyblends inside a mould is slightly higher than the temperature required for moving the dipoles.

In multiphase masses, the temperature depends on that melting range or glass temperature of the component which produces the main contribution to the double refraction. Some masses, however, have a uniform melting range as a result of the combination. This temperature is then sufficient to result in mechanical or optical isotropy in the finished synthetic resin part.

A synthetic resin part produced by the process according to the invention is characterised in that the mean value of double refraction is low over the whole cross-section.

The synthetic resin part produced by the process has a good statistical distribution of the dipole orientation so that the part no longer has a double refraction which could cause any technical dfficulties, especially in the optical range. The optical double refraction is reduced to ½, ⅓, 1/5 or even lower, compared with untreated materials. The deposition of dust is also thereby reduced, and the differential shrinkages and hence tendencies to distortion are also reduced.

In one particular embodiment, the ratio of highest to lowest double refraction in the synthetic resin part is less than 3:1, in particular less than 2:1.

It is astonishing to the man of the art that the high double refractions produced by shearing stresses during injection moulding and as a result of cooling in the marginal zones are to a large extent eliminated so that in spite of the unfavourable starting conditions an extremely low, almost uniform dielectrically isotropic distribution is obtained, in particular in the direction in which the force has been applied.

The masses used for this process may be chemical materials from the group of thermoplasts or duromers, which may be used singly or as combinations. Additives such as fillers, pigments and the like may be used, especially if they have a high dielectric loss factor.

Heating of the thermoplastic masses before they are subjected to the cooling process according to the invention may be carried out during the moulding process (injection moulding) in the usual manner. The masses could also be reheated by high frequency, microwave or ultrasound.

EXAMPLE 1

To reduce the double refraction, polycarbonate plates measuring $14 \times 14 \times 2$ mm were dielectrically heated in an alternating electric field at 2.45 GHz and an initial field strength of $5 \times 10^4$ V/cm until melting set in. The dielectric heating power was $N \sim \omega\ E^2\ tg\delta$, where $\omega = 2\pi f$ (f=frequency, E=electric field strength, $tg\delta$=dielectric loss factor).

The heating time was varied within the range of 5 to 15 seconds. The heating up phase was immediately followed by the cooling phase. During the cooling phase, the field strength was reduced to 5 to 10% of the value employed during the heating up phase (corresponding to 0.25 to 1% of the initial heating power). The cooling phase lasted 3 to 5 minutes. The temperature of the plates at the end of the cooling phase was about 20 to 50 deg. Cent. above room temperature.

A cylindrical microwave resonator with $E_{010}$ field type was used for producing the electric microwave field. The electric field extended parallel to the cylinder axis, where it had a maximum. The plate was arranged in the middle of the resonator so that the E field passed perpendicularly through the surface of the plate.

The field strength of about $5 \times 10^4$ V/cm applied at the beginning of the heating up period fell to about $10^4$ V/cm during the heating process due to increasing dielectric losses.

Figure 1:
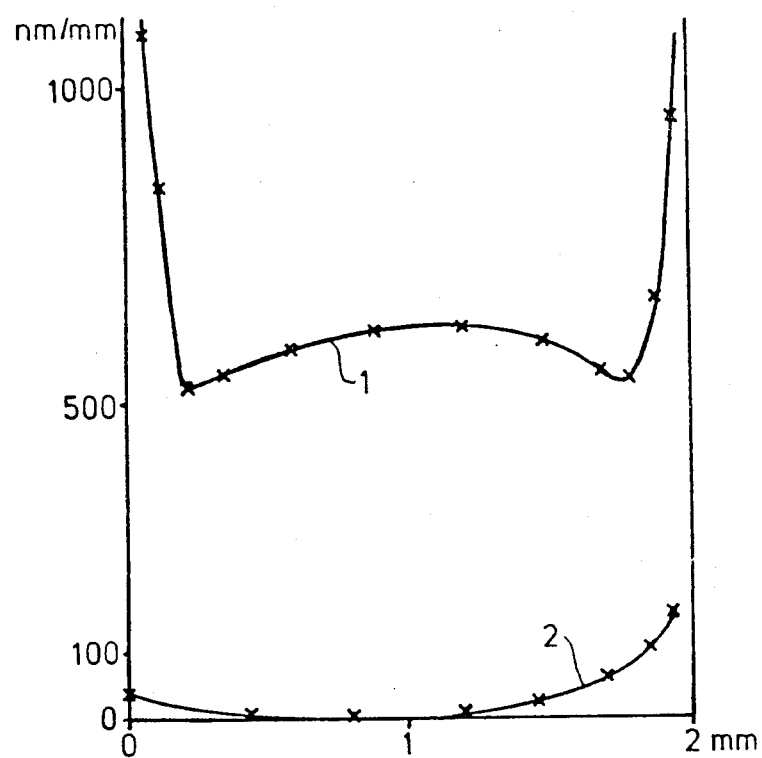
FIGS. 1 and 2 are graphic representations of the double refraction values through a sample before and after the pratice of the invention.

In the untreated plate, the double refraction in the sample, measured perpendicularly to the surfaces, was above 600 nm/mm in the middle region and increased to values above 1500 nm/mm in the outer zones (see drawing, FIG. 1, character 1). After the treatment, a value of less than 300 nm/mm was obtained over the whole cross-section and the typical increase in the outer zones could be prevented (see Drawing, FIG. 1, character 2).

EXAMPLE 2

Polycarbonate plates measuring $14 \times 14 \times 2$ mm were heated in a microwave field as described in Example 1 for 5 and 8 seconds and then cooled in a stepwise diminishing field. The electric field was reduced in four stages during the cooling phase. Each stage lasted one minute. The field strengths in the four stages of the cooling phase amounted to 15-10-5-2.5% of the field strength in the heating up phase.

Figure 2:
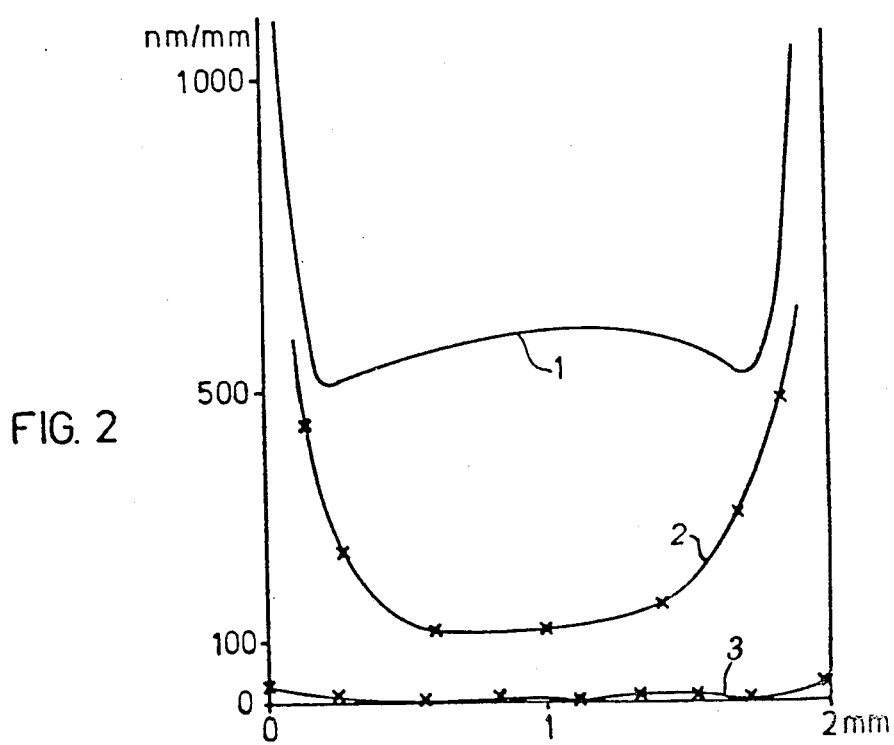

The double refraction in the sample could thus be uniformly reduced to less than 150 nm/mm over the whole cross-section, see FIG. 2.

The homogenizing effect of the alternating field treatment during the cooling phase is evident from a comparison with a sample which had been cooled in the absence of such a field, see Annexe:

- (character: 1) Heating in MW field, cooling without field
- (character: 2) Heating in MW field, cooling with 10% field, 3 minutes
- (character: 3) Heating in MW field, cooling in 15-10-5-2.5% field for one minute each.

We claim:

1. Process for the manufacture of synthetic resin parts having a quasi dielectric isotropic structure, in particular with low double refraction, in which a mass of synthetic resin part which is still at least partially deformable is converted, characterised in that
   (a) the synthetic resin part is subjected to an alternating field with a frequency of $10^{15}$–$10^{10}$ Hz,
   (b) the at least partially mobile dipoles of the dielectric synthetic resin part are subjected to a relaxation process, while energy is supplied, and
   (c) the alternating field is reduced continuously and/or stepwise until the dipoles freeze.

2. Process according to claim 1, characterised in that a temperature gradient counteracting the usual temperature gradient to the outside is adjusted by the supply of energy.

3. Process according to claim 1, characterised in that the alternating field employed is a steady electric alternating field with a frequency of $10^5$–$10^8$ Hz, with a field strength of 1–100 kV/cm.

4. Process according to claim 1, characterised in that the alternating field of oscillations are beamed in simultaneously in at least two directions perpendicular to one another.

5. Process according to claim 1, characterised in that the amplitude of the alternating field of oscillations is reduced from its initial value towards zero.

6. Process according to claim 1, characterised in that the synthetic mass is subjected to the alternating field before reaching a viscosity of 10,000 Pas.

7. Process according to claim 1, characterised in that in the case of amorphous thermoplasts in the form of a mass in a mould, the alternating field is switched ($T_g$) plus 80 deg. Cent.

8. Process according to claim 1, characterised in that in the case of partially crystalline thermoplasts in the form of a mass inside a mould, the alternating field is switched on at a temperature greater than or equal to the melting temperature ($T_s$) plus 10 deg. Cent.

9. Process according to claim 1, characterised in that in the case of blends or copolymers or mixed polymers in the form of a mass inside a mould, the initial temperature chosen is equal to or slightly higher than the temperature required for movement of the dipoles.

10. Process according to claim 6 wherein the synthetic mass is subjected to the alternating field before reaching a viscosity of 6000 Pas.

* * * * *

UNITED STATES PATENT AND TRADEMARK OFFICE
CERTIFICATE OF CORRECTION

PATENT NO. : 4 780 255
DATED : October 25, 1988
INVENTOR(S) : Hans-Werner Depcik et al It is certified that error appears in the above-identified patent and that said Letters Patent are hereby corrected as shown below:

In column 5, line 22, "$10^{15}$" should read -- $10^5$ --.

In column 6, line 17, after "switched" insert -- on at a temperature greater than or equal to the glass temperature --.

Signed and Sealed this

Sixteenth Day of May, 1989

Attest:

DONALD J. QUIGG

Attesting Officer

Commissioner of Patents and Trademarks